Patented Dec. 3, 1935

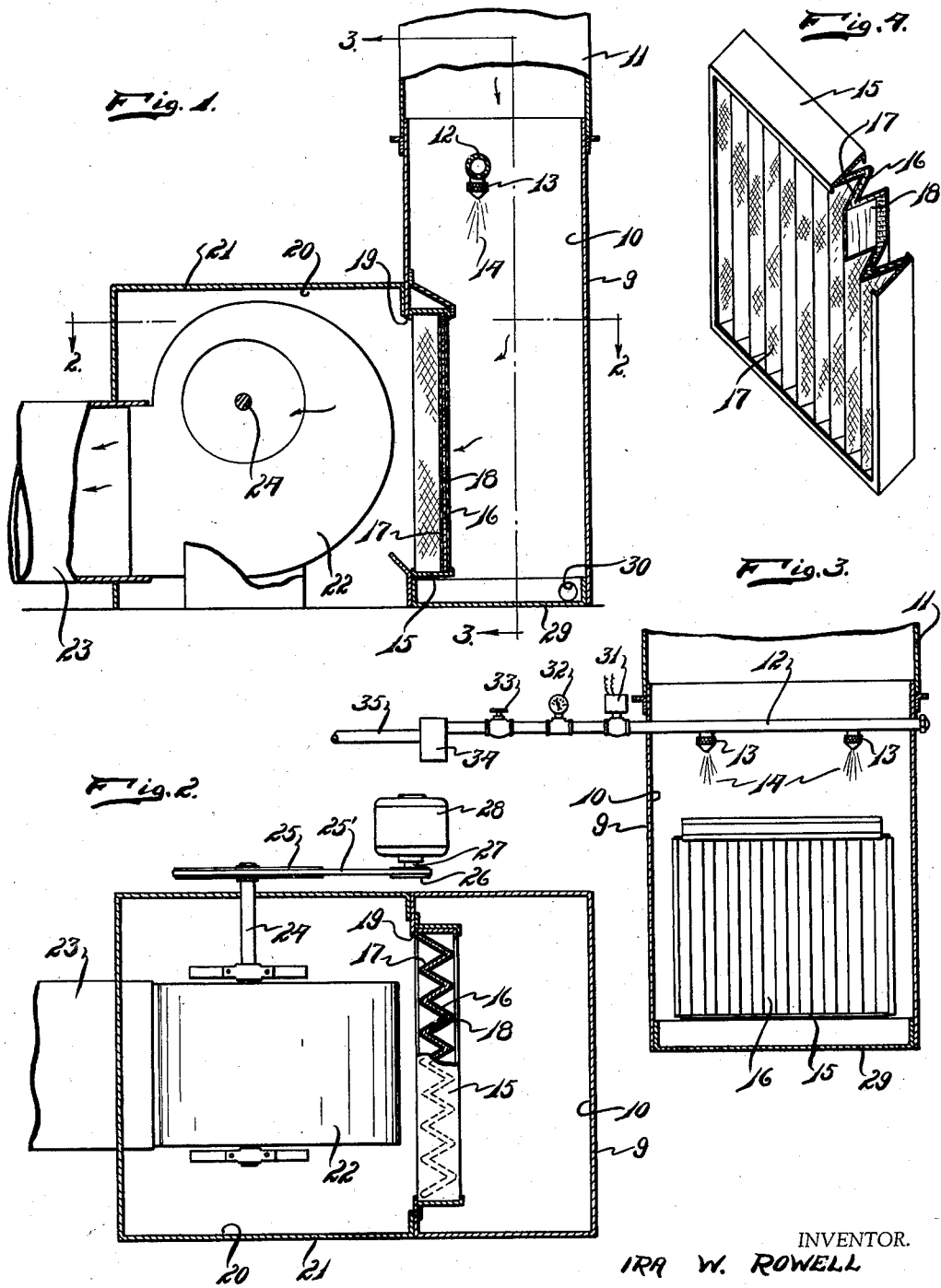

2,022,740

UNITED STATES PATENT OFFICE 2,022,740

AIR CONDITIONING DEVICE

Ira W. Rowell, Hermansville, Mich.

Application September 12, 1932, Serial No. 632,670

2 Claims. (Cl. 261—105)

My invention relates to a new and useful improvement in an air conditioning device and has for its object the provision of a device adapted for treating of air such as washing, humidifying, dehumidifying, cooling, filtering, scrubbing, and circulating of air in closed places such as rooms in buildings and the like, and the eliminating of water from the air.

It is another object of the present invention to provide a device of this class which may be easily and quickly adapted for automatic operation and which will lend itself for combination with air heating or cooling apparatus so that the device is effective for maintaining the air at a predetermined temperature without in any manner interfering with its operation of a humidifying, dehumidifying, washing, water eliminating, or scrubbing apparatus.

It is another object of the invention to provide a device of this class which may be readily adapted in recirculating air, in delivering fresh air from the outside atmosphere or in circulating a mixture of fresh air and recirculated air.

Another object of the invention is the provision of a device of this class which may be easily and quickly adapted for use with ozonizing or ionizing apparatus.

Another object of the invention is the provision in a device of this class of a filter element so arranged and constructed as to present a maximum arrangement in a predetermined space and so as to afford a device which will assist in mixing the moisture with the air, and at the same time to continuously remove impurities from the air.

Another object of the invention is the provision in a device of this class of a unit for the elimination of free water from the air passing from the spray chamber through the filter element into the blower chamber.

Other objects will appear hereinafter.

The invention consists in the combination and arrangement of parts hereinafter described and claimed.

The invention will be best understood by a reference to the accompanying drawing which forms a part of this specification and in which, Fig. 1 is a central vertical sectional view of the invention.

Fig. 2 is a sectional view taken on line 2—2 of Fig. 1 with parts broken away.

Fig. 3 is a sectional view taken on line 3—3 of Fig. 1.

Fig. 4 is a perspective view of the filter element with parts broken away and parts shown in section.

In the drawing I have illustrated a practical application of my invention in which I use a housing 9 which provides a spray chamber 10 connected with which is the conduit 11 through which the air passes in entering the spray chamber 10. Projecting inwardly of the spray chamber 10 is a water supply pipe 12 having the outlet spray nozzles 13 mounted thereon from which water delivered through the pipe 12 is adapted to pass in the form of a very fine spray or mist 14.

The filter which I provide embodies a frame 15 which serves as a support for the spaced layers 16 and 17 formed preferably of wire mesh or other suitable material which will not be impervious to air. Positioned between and held by the layers 16 and 17 is the layer 18 which constitutes the filtering medium. The layer I prefer to form from spun glass or glass wool as this forms a fibrous matting which serves as a spreading element, so as to thoroughly mix the air and the spray drawn therethrough and which also serves as a filter medium to remove impurities from the air and spray. As shown the retaining members 16 and 17 are in bellows form or sawtooth shaped in cross section so as to provide a maximum area of filtering medium within a defined space. This filtering element is positioned in upright position in front of the opening 19 leading from the spray chamber 10 and communicating with the blower compartment 20 in the housing 21. The spray when directed downwardly from the nozzles 13 will strike against the filtering medium and serve to thoroughly wash and maintain this filtering medium in clean condition. The filtering medium on account of its fibrous nature will also serve as a scrubbing agent for scrubbing and washing the air as it is drawn therethrough in conjunction with the moisture and eliminate water particles passing thereagainst.

Within the blower housing 21 is a blower 22 connected with an outlet conduit or pipe 23. A shaft 24 which serves to operate the blower is provided with a pulley 25 connected by the belt 25' to the pulley 26 mounted on the shaft 27 of the electric motor 28. The air delivered to the housing 20 may be air from the atmosphere, or partly air from the atmosphere and partly recirculated air, or it may be entirely recirculated air.

Positioned at the bottom of the spray chamber 10 is the drip pan or drainage tank 29 having an outlet opening 30 formed therein to which may be attached a suitable drain pipe connected with the sewer or returning to the original source of water supply.

Interposed between the supply pipe 12 and the water supply or delivery pipe 35 with which the supply pipe 12 is adapted to communicate is an electrically controlled or solenoid valve 31, a pressure gauge 32, a manually operated valve 33, and a water filter 34. The solenoid operated valve may, if desired, be humidostatically controlled by a humidostat located in the room or compartment to which the conditioned air is to be delivered. It is obvious that the air before being delivered to the spray compartment 10 may be cooled or heated using any kind of mechanical or electrical ice or refrigerating machine or any type of direct or indirect heater, as desired, and the solenoid valve and its controlling humidostat regulated as to humidity, while the temperature may be suitably controlled by a thermostat. The temperature thermostats and humidostats being well-known and their operation and installation being also well-known, it has been deemed unnecessary to illustrate the same as these elements, of themselves, form no part of the present invention. It is also believed obvious that the air before entry into the spray chamber may be treated by an ozonizer or by an ionizer.

In operation when the blower is started the air surrounding the blower will be withdrawn thus creating an area of low pressure permitting the air to flow from the spray chamber 10 into the blower housing 21. The air, as it passes through the spray chamber 10, will pass through the spray 14 and dust and other foreign material will thus be washed from the air at the same time the proper humidification of the air will be effected. The air passing from the spray chamber 10 will be directed through the filter element which will serve to further purify, cleanse, and scrub the air, and to eliminate any free moisture carried along in the air stream. The spray washing against the filter element will drive the foreign material downwardly into the drain tank 29. It is obvious that the temperature of the air may also be regulated by the spray by regulating the temperature of the spray so that either cooling or heating of the air may be effected to some extent in the spray chamber 10.

It is desired that the solenoid valve 31 be connected in the same circuit as the motor 28 so that when the blower 22 ceases operating the delivery of spray into the spray chamber will be stopped, thus there would be an automatic operation of the device depending upon the humidity or upon the temperature. The humidostat will, of course, be connected in series with the motor 28 which drives the blower so that when the motor 28 is stopped and the blower ceases operating, the valve 31 will be closed and the spray will stop.

It is preferred that the blower housing 21 be mounted on the floor or foundation of the apparatus so that the blower housing 21 is closed to all sources of air except through the filter element. It is believed obvious that the conduit 11 may be connected to return ducts to a hot air furnace or to a source of air which is heated by any type of furnace or heater, or this conduit 11 will be connected directly to the atmosphere.

From the description given the simplicity and economical construction of the device is apparent and it is also believed apparent that the device is of such compact form as to occupy a minimum amount of space while still being adapted for use in the various manners indicated.

While I have illustrated and described the preferred form of my invention I do not wish to limit myself to the precise details of structure shown, but desire to avail myself of such variations and modifications as may come within the scope of the appended claims.

Having thus described my invention, what I claim as new and desire to secure by Letters Patent is:

1. In combination, a spray chamber having an opening formed in one side adjacent the lower end thereof; a blower housing having one of its sides abutted against said side of said chamber and having an opening formed in its side registering with the opening in said chamber; a frame framing said opening in said chamber; a filtering element in said frame and serving as a closure therefor, said element being pervious as to air and preventing passage of particles of water from said chamber into said housing; and means in said chamber for delivering a spray of water downwardly against the face of said element, said element being extended in vertical position.

2. In combination, a spray chamber having vertically extended side walls and having an opening formed in one of said side walls adjacent the bottom thereof; a blower housing exterior of said chamber and having a wall abutting said side of said chamber and having an opening formed therein in registration with the opening in said chamber; a frame surrounding said opening; a filtering element filling said frame; a blower in said housing; an outlet conduit communicating with said blower and said housing; and means for delivering a spray of water downwardly against the face of said element.

IRA W. ROWELL.